United States Patent
Vignotto et al.

(10) Patent No.: US 7,628,541 B2
(45) Date of Patent: Dec. 8, 2009

(54) SEALING DEVICE FOR A WHEEL HUB UNIT

(75) Inventors: Angelo Vignotto, Turin (IT); Claudio Savarese, Airasca (IT); Gianmario Fadda, Borgaro Torinese (IT); Massimo Russo, Turin (IT)

(73) Assignee: Aktiebolaget SKF, Gothenburg (SE)

( * ) Notice: Subject to any disclaimer, the term of this patent is extended or adjusted under 35 U.S.C. 154(b) by 604 days.

(21) Appl. No.: 11/116,620

(22) Filed: Apr. 27, 2005

(65) Prior Publication Data

US 2005/0259901 A1 Nov. 24, 2005

(51) Int. Cl.
*F16C 33/76* (2006.01)
*F16J 15/32* (2006.01)

(52) U.S. Cl. .................. 384/477; 384/484; 384/486; 277/549

(58) Field of Classification Search .................. 384/544, 384/589, 477, 484, 448, 480, 486; 277/549, 277/571, 572
See application file for complete search history.

(56) References Cited

U.S. PATENT DOCUMENTS

| | | | |
|---|---|---|---|
| 3,203,740 A * | 8/1965 | Peickii et al. | ................ 384/486 |
| 5,492,417 A | 2/1996 | Baker et al. | |
| 6,050,571 A * | 4/2000 | Rieder et al. | ................ 277/353 |
| 6,217,220 B1 | 4/2001 | Ohkuma et al. | |
| 6,974,136 B2 * | 12/2005 | Vignotto et al. | ............. 277/549 |

FOREIGN PATENT DOCUMENTS

EP    1 447 240 A2    8/2004

\* cited by examiner

*Primary Examiner*—Thomas R Hannon
*Assistant Examiner*—Justin Krause
(74) *Attorney, Agent, or Firm*—Merchant & Gould P.C.

(57) ABSTRACT

Sealing device (1) for a wheel hub group (2) which is connected to a differential device, and which is provided with a rolling contact bearing (3), the sealing device being provided with a first shield (6) which is shrink-fit onto an inner race (4) of the rolling contact bearing (3), and an encoder (7) which is integral with the first shield (6) in order to generate a signal for reading the functioning kinematic parameters of the wheel hub group (2), and is also provided with a second shield (8) which is shrink-fit onto an outer race (5) of the rolling contact bearing (3) in a position which is opposite to and which is also external to the inner shield; a static sealing element (12) is integral with the second shield (8), and is also arranged in contact with a containing box of the differential in order to define a watertight chamber (14) in order to provide a reading surface of a reading sensor (11) which can read the signal which is generated by the encoder itself.

9 Claims, 1 Drawing Sheet

SEALING DEVICE FOR A WHEEL HUB UNIT

Figure 1:
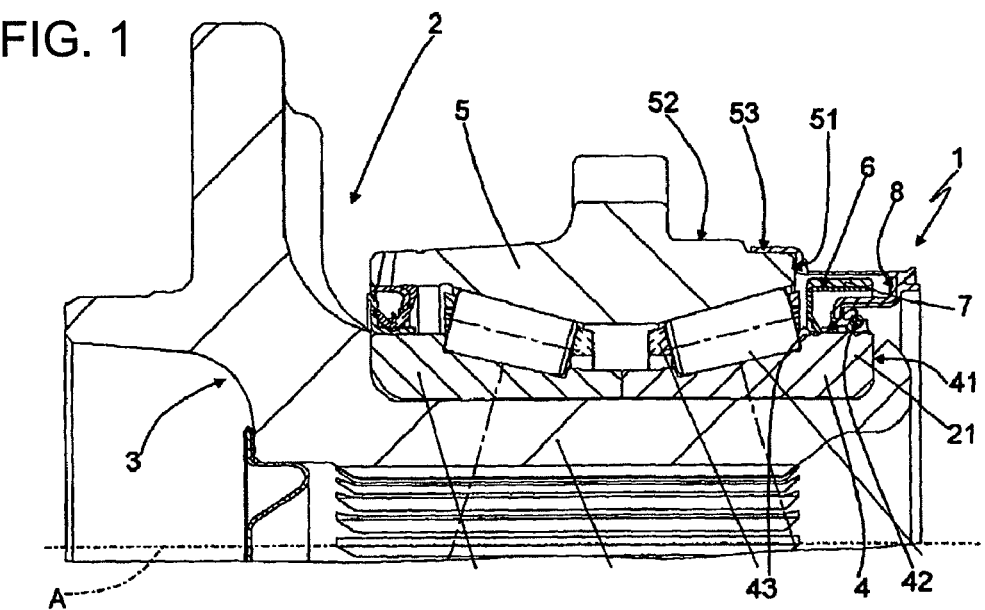

The present invention refers to a sealing device for a wheel hub unit.

The present invention may be advantageously, but not exclusively, used in applications in the field of wheel hub units connected to the differential of a vehicle, and provided with a rolling contact bearing, and in which the sealing device is mounted in such a way as to protect the bearing on an inner side of the bearing, or rather on a side of the bearing which is turned towards the differential. The description which follows will refer, by way of an example, to this specific kind of application without, however, losing any of its general nature.

In the application which has just been described above, the wheel hub unit and the differential are connected to each other by means of a semi-axis, which is arranged inside a sealing box which extends from the differential as far as the wheel hub unit, and which is substantially embedded in a lubricating fluid which is contained inside the sealing box in order to lubricate the differential and the semi-axis themselves.

The sealing device comprises, in its most generic form, an inner shield which is shrink-fit onto an inner race of the bearing, an encoder which is integral with the inner shield in order to generate a signal for reading the kinematic parameters of the functioning of the wheel hub unit, and an outer shield, which is shrink-fit onto an outer race of the bearing in a position which counter-faces and is external to the inner shield, and is provided with at least one window, which his hermetically sealed by means of an elastic membrane, and which is suitable for being engaged by a reading sensor for a signal which is generated by the encoder itself.

In particular, the sensor is arranged with a reading surface abutting the elastic membrane in such a way as to be protected from any metallic contaminating agents which might be present in the lubricating fluid, and which might impinge upon the quality of the reading of the signal which is generated by the encoder.

Although the above-described sealing devices have proven to be fairly reliable, yet taking into consideration the crucial nature of a correct reading of the signal, the aim of the present invention is to produce a sealing device for a wheel hub unit which will guarantee an even more exact reading of the signal.

The aim of the present invention is to produce a sealing device for a wheel hub unit which will be free of the above-described disadvantages.

According to the present invention, a sealing device will be produced for a wheel hub unit connected to a differential device, and provided with a contact rolling bearing, the sealing device comprising a first shield which is shrink-fit onto an inner race of the bearing, an encoder which is integral with the first shield in order to generate a signal for reading the kinematic parameters of the functioning of the wheel hub unit, and a second shield which is shrink-fit onto an outer race of the bearing in a position which counter-faces and is external to the first shield, and is provided with at least a window, which is hermetically sealed by a membrane, and is suitable for being engaged by a reading sensor which reads a signal which is generated by the encoder itself; the sealing device being characterised by the fact that it comprises a static sealing element, which is integral with the second shield, and which is interposed between the second shield and a containing box which extends from the differential as far as the wheel hub unit in order to define a watertight chamber for a reading surface of the sensor which is at least isolated from the part of the said differential.

Figure 2:
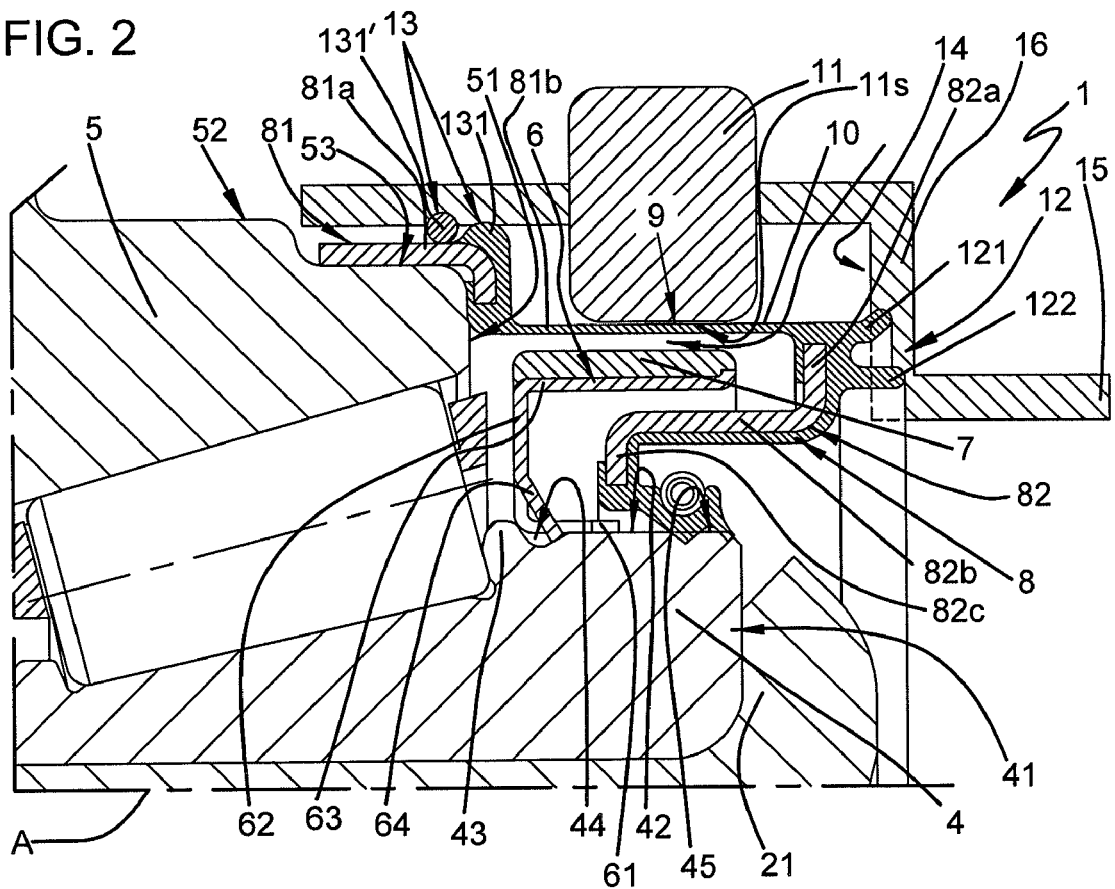

The present invention will now be described with reference to the attached drawings, which illustrate a non-limiting form of embodiment of the present invention, and in which:

FIG. 1 is a section view, with some parts in schematic form for reasons of clarity, of a first preferred form of embodiment of the sealing device for a wheel hub unit according to the resent invention; and FIG. 2 illustrates, in section and on an enlarged scale, a detail of the device which is shown in FIG. 1.

With reference to FIGS. 1 and 2, the number 1 indicates a sealing device for a wheel hub unit in its entirety.

The unit 2 is connected to a differential device (which is noted but not illustrated), and is provided with a rolling contact bearing 3 comprising an inner race 4 which is co-axial to a rotation axis A of the bearing 3 itself, and an outer race 5 which is co-axial to the inner race 4.

In particular, the outer race 5 presents a frontal annular surface 51 which is transverse to the axis A, an outer cylindrical surface 52 which is co-axial to the axis A, and a cylindrical outlet 53, which is contiguous with and transverse to the surface 51, and which is obtained by radially lowering the surface 52. Instead, the inner race 4 presents a frontal annular surface 41 which is axially staggered towards the outside in relation to the surface 51, and which abuts a rolled border 21 of the wheel hub unit 2, and a respective outer cylindrical surface 42, which is geometrically delimited in an axial direction by the surfaces 41 and 51, and which is radially faced by the bearing 3 from the outside.

The inner race 4 also comprises an inner step 43 which is radially raised in relation to the surface 42, and an annular throat 44, which is obtained in correspondence with the step 43 in order to separate the step 43 itself from the surface 42, and which is arranged axially inside the surface 42 itself.

The sealing device 1 comprises an inner shield 6 which is shrink-fit onto the surface 42, and encoder 7 which is integral with the shield 6 in order to generate a signal for the reading of the kinematic parameters of the functioning of the wheel hub unit, and an outer shield 8, which is shrink-fit onto the outer race 5 in a position which counter-faces and is external to the shield 6, and which is provided with two windows 9 (only one of which is illustrated) which are arranged diametrically opposite the axis A and hermetically sealed by a covering elastic membrane 10 which is substantially integral with the shield 8. In the form of embodiment which is illustrated in FIGS. 1 and 2, the window 9 is suitable for being engaged by a sensor 11, which is suitable for reading a signal which is generated by the encoder 7, and which is arranged with a reading surface 11s abutting the membrane 10

The shield 6 is made of metallic material, and comprises an assembly wall 61 which is of a cylindrical shape and which is shrink-fit onto the surface 42, an annular flange 62 which is transverse to the wall 61 and which abuts the step 43, and a support wall 63, which is transverse to the flange 62 and which is arranged co-axially and radially outside the wall 61 in order to support the encoder 7 in a position which faces the window 9.

The shield 6 also comprises a number of elastic tongues 64, which are obtained by partial shearing of the wall 61 and the flange 62, and which are arranged at an angle in relation to the flange 62 itself so that they can be snap inserted inside the throat 44 in such a way as to axially block the shield 6 and prevent, together with the step 43, any accidental displacement whatsoever from its original assembly position.

The shield 8 is made of metallic material, and comprises a respective assembly wall 81 which is of a cylindrical shape and which is shrink-fit onto the surface 52, and a shaped wall 82 which is integral with the wall 81.

In particular, the wall 81 is defined by two portions 81a and 81b which are axially aligned and which have different diameters from each other, and of which the portion 81a presents a diameter of a dimension which is greater than that of a dimension of the portion 81b and is shrink-fit into the outlet 53, while the portion 81b is arranged axially to the outside in relation to the portion 81a, and presents the windows 9. The shaped wall 82 comprises an annular position 82a which is integral with the portion 81b, and a cylindrical portion 82b, which extends axially in an intermediate position between the walls 61 and 62, and which presents an end radial tuck 82c which is directed towards the wall 61.

In order to isolate the reading surface 11s of the sensor 11 from the outside, as well as to protect the surface 11s itself from the metallic contaminating agents which are present in the lubricating oil of the differential device, the device 1 comprises two static sealing elements 12 and 13, which are axially arranged opposite the membrane 10 and which cooperate with the membrane 10 itself in order to create a watertight chamber 14 around the surface 11s.

The element 12 is integral with the shield 8, and is interposed between the shield 8 itself and a containing box 15, which extends from the above-mentioned differential as far as the wheel hub unit 2 in order to be substantially embedded in the portion 81a of the wall 81, and it presents an inner countercheck shoulder 16 which is arranged in a frontal position in relation to the portion 82a of the wall 82.

The element 12 comprises two sealing lips 121 and 122, which extend in a substantially axial direction from the portion 82a, and are arranged co-axially in relation to the other and in contact with the shoulder 16.

The lips 121 and 122 are suitable for being axially deformed when they come into contact with the shoulder 16, further permitting greater tolerance in terms of mounting the box 15, and blocking any passage whatsoever of metallic contaminating agents from the box 15 in the direction of the chamber 14. The lip 121 is radially arranged co-planar to the membrane 10, and is of a substantially tapering shape, while the lip 122 is radially arranged inside the lip 121, and extends transversely from the portion 82a in the direction of the shoulder 16.

In a first case, the element 13 can be integrated with the shield 8, as is illustrated by the solid line, or, in a second case, it can alternatively be rendered independent of the shield 8 in order to be mounted onto the shield 8 itself, as is illustrated by the broken line.

In the first case, the element 13 in arranged in correspondence with the reduction in diameter between the portion 81a and the portion 81b of the wall 81, and is defined by an annular protuberance 131, which is closely connected to the wall 81 itself, and which extends from the shield 8 in order to define a radial extension of the membrane 10 associated with the portion 81a of the wall 81.

The protuberance 131 may, for example, be made by vulcanising rubber material, and is arranged in close contact with the box 15 in order to be compressed and deformed by the box 15 itself.

In the second case, the element 13 is instead defined by a ring 131' which is made of rubber material and which is interposed between the portion 81a and the box 15 in order to close the watertight chamber 14 opposite the lips 121 and 122, and is freely mounted onto the portion 81a itself in order to be compressed by the box 15 at the time when the box 15 is mounted.

Finally, the device 1 comprises a dynamic sealing element 17, which is integral with the shield 8 and which is defined by a sealing lip which is anchored to the tuck 82c, and is arranged in sliding contact with a contact portion 45 of the surface 42. In particular, the portion 45 is left free from the wall 61 thanks to the presence of the tongues 64 which, as they permit the shield 6 to be anchored to the race 4, also permit a reduction in the axial dimensions of the wall 61 itself in relation to the surface 42.

It is intended that the present invention should not be limited to the form of embodiment which is herein described and illustrated, which is to be considered as an example of a form of embodiment of a sealing device for a wheel hub unit and which may be subject to further modifications regarding to the shape and disposition of its and to details pertaining to construction and assembly.

The invention claimed is:

1. Sealing device configured for mounting to a wheel hub unit connected to a differential device, and provided with a contact rolling bearing, the sealing device comprising: a first shield configured for being shrink-fit onto an inner race of the bearing, an encoder integral with the first shield to generate a signal for reading kinematic parameters of functioning of the wheel hub unit, and a second shield configured for being shrink-fit onto an outer race of the bearing in a position counter-facing and external to the first shield, and wherein the second shield is provided with a window hermetically sealed by a membrane, and is suitable for being engaged by a reading sensor reading a signal generated by the encoder; wherein the sealing device comprises a first static sealing element integral with the second shield and extending interposed between the second shield and a containing box configured to extend from the differential as far as the wheel hub unit to define a watertight chamber for a reading surface of the sensor at least isolated from part of the differential, wherein said first static sealing element comprises at least one sealing lip on a first axial side of said sensor extending in a substantially axial direction from the second shield and arranged in contact with a a complementary shoulder of said box; a second sealing element on a second axial side of said sensor and interposed between the second shield and the box projecting radially outward and spaced radially outward from said first sealing element to close said watertight chamber from the side opposite the differential.

2. Sealing device according to claim 1, wherein said first static sealing element comprises two sealing lips extending in a substantially axial direction from the second shield, and are arranged in contact with a complementary recess formed in a shoulder of said box.

3. Sealing device according to claim 1, wherein said second sealing element is defined by a rubber ring mounted on a radially external portion of said second shield.

4. Sealing device according to claim 1, wherein said second sealing element is defined by a rubber ring which is integral with a radially external portion of said second shield.

5. Sealing device according to claim 1, wherein said first static sealing element comprises two sealing lips extending in a substantially axial direction from the second shield, and are arranged in contact with first and second complementary recesses formed in a shoulder of said box.

6. Sealing device according to claim 1, wherein said first shield comprises axial blocking means in order to axially block the first shield onto an external cylindrical surface of the inner race while leaving free a contact portion of the external cylindrical surface.

7. Sealing device according to claim 6, wherein said external cylindrical surface of the inner race presents an annular throat obtained in an axially inner position in regard to the external cylindrical surface; said blocking means being snap-inserted inside the throat when the first shield is being mounted.

8. Sealing device according to claim 6, comprising a dynamic sealing element which is integral with the second shield and arranged in sliding contact with said contact portion of the external cylindrical surface.

9. A wheel hub having a sealing device, the wheel hub being connected to a differential device, and provided with a contact rolling bearing, the sealing device comprising a first shield shrink-fit onto an inner race of the bearing, an encoder integral with the first shield to generate a signal for reading kinematic parameters of wheel hub functions, and a second shield shrink-fit onto an outer race of the bearing in a position counter-facing and external to the first shield, wherein the second shield is provided with at least a window, hermetically sealed by a membrane, and is suitable for being engaged by a reading sensor reading a signal generated by the encoder; and wherein the sealing device comprises a first static sealing element, integral with the second shield, and extending interposed between the second shield and a containing box extending from the differential as far as the wheel hub unit to define a watertight chamber for a reading surface of the sensor at least isolated from part of the differential, wherein said first static sealing element comprises two sealing lips on a first axial side of said sensor extending in a substantially axial direction from the second shield and arranged in contact with first and second complementary recesses formed in a shoulder of said box; a second sealing element on a second axial side of said sensor and interposed between the second shield and the box projecting radially outward and spaced radially outward from said first sealing element to close said watertight chamber from the side opposite the differential.

* * * * *